United States Patent
Cheng et al.

(10) Patent No.: US 7,237,256 B2
(45) Date of Patent: Jun. 26, 2007

(54) METHOD AND SYSTEM FOR PROVIDING AN OPEN AND INTEROPERABLE SYSTEM

(75) Inventors: Qingwen Cheng, Fremont, CA (US); Bhavna Bhatnagar, Sunnyvale, CA (US); Hong Xu, Palo Alto, CA (US); Wei Sun, Los Altos, CA (US); Ping Luo, Union City, CA (US); Shivaram Bhat, Sunnyvale, CA (US); Aravindan Ranganathan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 777 days.

(21) Appl. No.: 10/619,657

(22) Filed: Jul. 14, 2003

(65) Prior Publication Data

US 2005/0015593 A1 Jan. 20, 2005

(51) Int. Cl.
*H04L 9/32* (2006.01)

(52) U.S. Cl. .................................. 726/3; 726/4; 726/8

(58) Field of Classification Search ................ 726/1–6, 726/27–30, 8; 709/223, 225, 229
See application file for complete search history.

(56) References Cited

U.S. PATENT DOCUMENTS

| | | | |
|---|---|---|---|
| 5,898,780 A | 4/1999 | Liu et al. | |
| 5,944,824 A | 8/1999 | He | |
| 6,161,139 A | 12/2000 | Win et al. | |
| 6,587,124 B1 | 7/2003 | Slaby | |
| 6,807,636 B2 * | 10/2004 | Hartman et al. | 726/14 |
| 6,892,307 B1 | 5/2005 | Wood et al. | |

(Continued)

FOREIGN PATENT DOCUMENTS

EP 1370963 A1 3/2002

(Continued)

OTHER PUBLICATIONS

Liberty Alliance Project, "Liberty ID-FF Architecture Overview," Version 1.2, 2003, pp. 1-44.

(Continued)

*Primary Examiner*—Hosuk Song
(74) *Attorney, Agent, or Firm*—Hickman Palermo Truong & Becker LLP; Bobby K. Truong

(57) ABSTRACT

Embodiments of the present invention provide an open and interoperable single sign-on session in a heterogeneous communication network. The open and interoperable single sign-on system is configured by exchanging an entity identifier, an account mapping, an attribute mapping, a site attribute list, an action mapping and/or the like. The entity identifier, account mapping, attribute mapping, site attribute list, action mapping and the like for each partner entity is stored in a partner list accessable to the particular entity. Thereafter, the open and interoperable single sign-on session may be provided upon receipt of a SAML request or assertion containing an entity identifier. The entity identifier contained in the SAML request or assertion is looked-up in the partner list of the particular entity which received the SAML request or assertion. A record containing a matching entity identifier provides the applicable account mapping, attribute mapping, site attribute list, and/or action mapping. The one or more mappings are then utilized to process the SAML request or assertion.

26 Claims, 7 Drawing Sheets

U.S. PATENT DOCUMENTS

| | | |
|---|---|---|
| 2003/0172127 A1 | 9/2003 | Northrup et al. |
| 2004/0001594 A1 | 1/2004 | Krishnaswamy et al. |
| 2004/0003139 A1 | 1/2004 | Cottrille et al. |
| 2004/0003251 A1 | 1/2004 | Narin et al. |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0117170 A1 | 6/2004 | Walsh et al. |
| 2004/0117460 A1 | 6/2004 | Walsh et al. |

FOREIGN PATENT DOCUMENTS

| | | |
|---|---|---|
| EP | 1091274 A2 | 4/2002 |
| GB | 2387991 A | 3/2003 |
| WO | WO 00/60484 A1 | 5/2000 |
| WO | WO 02/058336 A1 | 7/2002 |

OTHER PUBLICATIONS

United Kingdom Patent Office, "Examination Report under Section 18(3)" in regards to Application No. GB0507718.5, report dated May 16, 2006, 2 pages.

Current Claims, Application No. GB0507718.5, 9 pages.

United Kingdom Patent Office, "Combined Search and Examination Report," in regards to Application No. GB0507718.5, report dated Jun. 23, 2005, 5 pages.

Current Claims, Application No. GB0507718.5, 8 pages.

* cited by examiner

| SERVER B | CERTIFICATE OF B | NETWORK ADDRESS OF B | ACCOUNT MAPPER OF A TO B | ATTRIBUTE MAPPER OF A TO B | SITE ATTRIBUTE LIST OF A TO B | ACTION MAPPER OF A TO B |
|---|---|---|---|---|---|---|
| SERVER C | CERTIFICATE OF C | NETWORK ADDRESS OF B | ACCOUNT MAPPER OF A TO C | ATTRIBUTE MAPPER OF A TO C | SITE ATTRIBUTE LIST OF A TO C | ACTION MAPPER OF A TO C |
| . . . | . . . | . . . | . . . | . . . | . . . | . . . |
| 420 | 420 | 440 | 450 | 460 | 470 | 480 |

PARTNER LIST

METHOD AND SYSTEM FOR PROVIDING AN OPEN AND INTEROPERABLE SYSTEM

FIELD OF THE INVENTION

Embodiments of the present invention relate to network communication systems, and more particularly to an open and interoperable SAML session on a network.

BACKGROUND OF THE INVENTION

Referring to FIG. 1, a block diagram of a network according to the conventional art is shown. As depicted in FIG. 1, a plurality of organizations 105–120 are communicatively coupled by one or more communication channels 190, 195, such as the internet or an extranet. Each organization 105–120 typically comprises a plurality of client devices 125–165 communicatively coupled to one or more servers 170–182. The servers 170–182 provide one or more resources, such as execution of applications and/or storage of information.

In the conventional art, the client 125 logs-on to a particular entity's server 170, wherein the user provides a username, password and/or the like. Based upon the username, password and the like, the server 170 authenticates the client 125 and determines the client's 125 authorization to access particular resources.

If the client 125 then tries to access resource on another server 172, establishing authentication and utilizing resources is problematic. The other servers 172–182 do not know that the client device 125 has been authenticated by a particular server 170. Furthermore, each organization 105–120 and/or server 170–182 may have a different login script, may require a different protocol, may utilize different information, may store the same information in differing structures, formats and/or the like. Therefore, the client typically has to sign onto each server 170–182 separately.

For example, a user may wish to access resources on various organizations 105–115 in the performance of their work, such as using the internet 190 to make travel arrangements. The user first logs-on to the company's (e.g., Widget Corp.) network server 170 utilizing a client device 125. The user may manually or via a script, enter their username (e.g, jdoe) and password in order to logon to the network server 170. The network server 170 provides an internet portal.

The user may then navigate using a browser to the website of an airline 115. The user will likely be required to enter their name, address and the like to book a flight. The user's address may be stored as a single field (e.g., address) in a record corresponding to the user's reservation. Similarly, the user may then navigate to a car rental agency 110 to reserve a rental car. Once again, the user may be requested to enter their name and address to reserve the car. The user's address may be stored as a plurality of fields (e.g., street address, city, state, zip code) in the record corresponding to the user's reservation. Similarly, the user may also navigate to a website of a hotel chain 120 to reserve a room. The user may be requested to enter a username (e.g, janed), password and the like to reserve the room using a corporate account.

Heterogeneous systems require various information. Some information may be common to each, while other information may be unique to one or more systems. Each system may also store the same information in various different formats. Thus, the interoperability of the various systems is problematic. Furthermore, the need to logon to each entity's server 170–172 and re-enter the same information (e.g., address, username) reduces the users satisfaction and productivity.

The need to logon multiple times is not limited to moving between multiple entities 105–120. For example, the user may login to their employer's network server 170 to access the finance server 180. The user may again be required to enter a username, password and the like in order to enter expenses, such as meals, entertainment and gas, incurred during their business travel. Along with entering a username, password and the like, the user may be required to enter their social security number, which is utilized to limit authorization to resources on the finance server 180. The financial server 180 may save the social security number in a field entitled "ssn." The user may then wish to check their retirement account. Once again the user may be required to provide a username, password and the like to access the payroll server 182 in order to check their retirement account. Along with enter a username, password and the like, the user may be required to enter their social security number, which the server utilizes to limit authorization to utilize resources on the payroll server 182. The financial server 180 may save the social security number in a field entitled "social security." Accordingly if different fields contain the same information, the interoperability of the systems may be limited even though the fields are substantially the same.

The Security Assertion Markup Language (SAML) specification is intended to provide a solution allowing single sign-on for secure authentication and authorization. SAML is an eXtensible Markup Language (XML) standard designed for business-to-business (B2B) and business-to-consumer (B2C) transactions.

Referring now to FIG. 2A, an exemplary SAML request/assertion according to the conventional art is shown. As depicted in FIG. 2A, SAML requests and assertions 210 are transmitted within a SOAP envelope 215 via HTTP 220.

Referring now to FIG. 2B, an exemplary SAML data packet according to the conventional art is shown. As depicted in FIG. 2B, the data packet comprises an HTTP header 250, a SOAP header 255 and a SAML payload 260. A request or assertion is encoded into the SAML payload 260. A SOAP header 255 is then generated and attached to the SAML payload 260. An HTTP header 250 is then generated and attached to the SOAP header 255 and SAML payload 260. The SAML payload containing a request or assertion may comprise an issuer identifier, an assertion identifier, an optional subject, an optional advice, a condition, an audience restriction, a target restriction, an application specific condition and the like.

Upon receipt, the HTTP header 250 is processed to provide routing and flow control. The SOAP header 255 is then processed to provide information concerning the content of the payload and how to process it. The SAML payload 260 may then be processed to provide security information.

Security Assertion Markup Language (SAML) for single sing-on functionality is intended to allow users to authenticate themselves in one domain and use the resources in another domain without re-authenticating themselves. SAML is intended to be an open and interoperable design for web-based single sign-on service functionality. However, differences in the organization and utilization of information limit the application of SAML in a heterogeneous network.

SUMMARY OF THE INVENTION

Embodiments of the present invention provide an open and interoperable single sign-on session in a heterogeneous communication network. Embodiments of the present invention advantageously enable interoperation of disparate security service systems. Embodiments of the present invention comprise mapping elements of a SAML request or assertion that related to the content and organization of information utilized by the present entity to the corresponding content and organization of information utilized by a partner entity.

Embodiments provide a method and system of configuring an open and interoperable single sign-on session. An administration module provides for receipt of an entity identifier of a partner entity, an account mapping between the partner entity and the present entity, an attribute mapping between the partner entity and the present entity, a site attribute list between the partner entity and the present entity, an action mapping between (e.g., authorization decision) the partner entity and the present entity, and/or the like. The entity identifier, account mapping, attribute mapping, site attribute list, action mapping and the like for each partner entity is stored in a trusted partner list accessible to the present entity.

Embodiments are directed to a method and system of providing an open and interoperation single sign-on session. Upon receipt of a SAML request or assertion containing an entity identifier, the entity identifier is looked-up in a trusted partner list of the present entity. A record containing a matching entity identifier provides the applicable account mapping, attribute mapping, site attribute list, and/or action mapping. The one or more mappings are then utilized to process or generate the SAML request or assertion.

Embodiments of the present invention provide a unique SAML configuration defining the mapping between heterogeneous partner sites. An account mapping defines how a subject between two entities are mapped. An attribute mapping defines how an attribute is mapped from a first entity to a second entity. A site attribute list defines an attribute that needs to be returned by said first entity to said second entity. An action mapping defines how an authorization decision of said first entity is mapped to and authorization decision of said second entity

BRIEF DESCRIPTION OF THE DRAWINGS

The present invention is illustrated by way of example and not by way of limitation, in the figures of the accompanying drawings and in which like reference numerals refer to similar elements and in which:

FIG. 4 shows an exemplary trusted partner list, in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
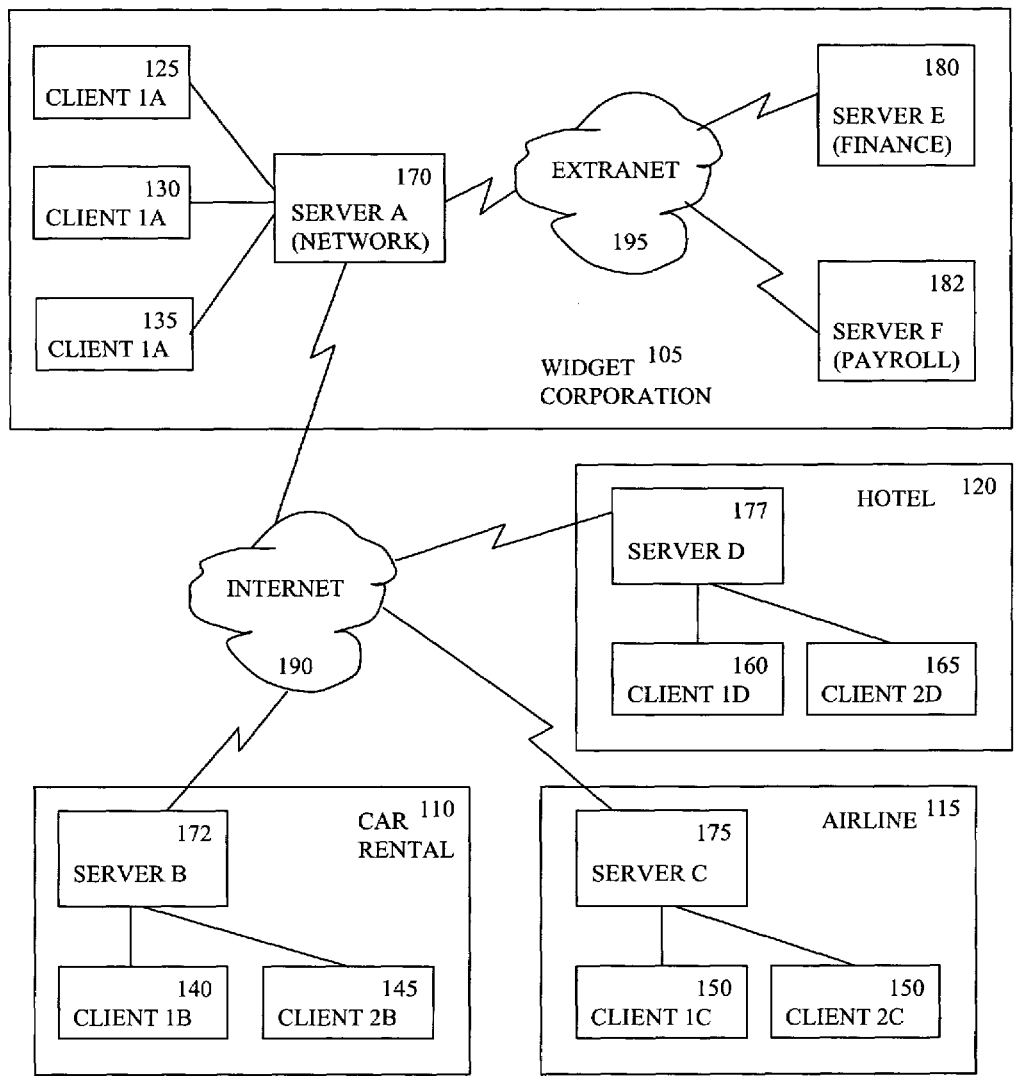
FIG. 1 shows a block diagram of a network according to the conventional art.
Figure 2A:
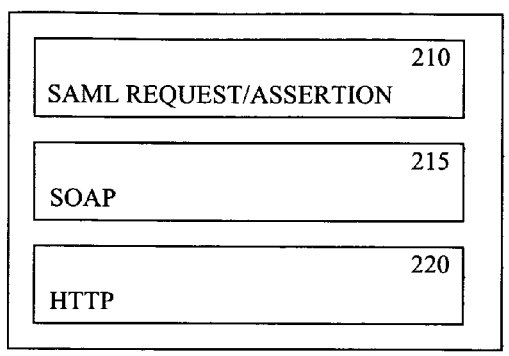
FIG. 2A shows an exemplary SAML request/assertion according to the conventional art.
Figure 2B:
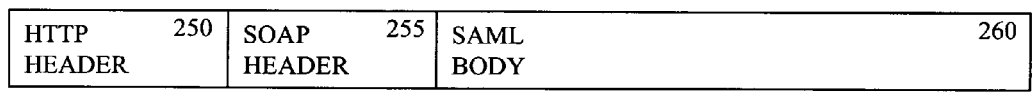
FIG. 2B shows an exemplary SAML data packet according to the conventional art.
Figure 3:
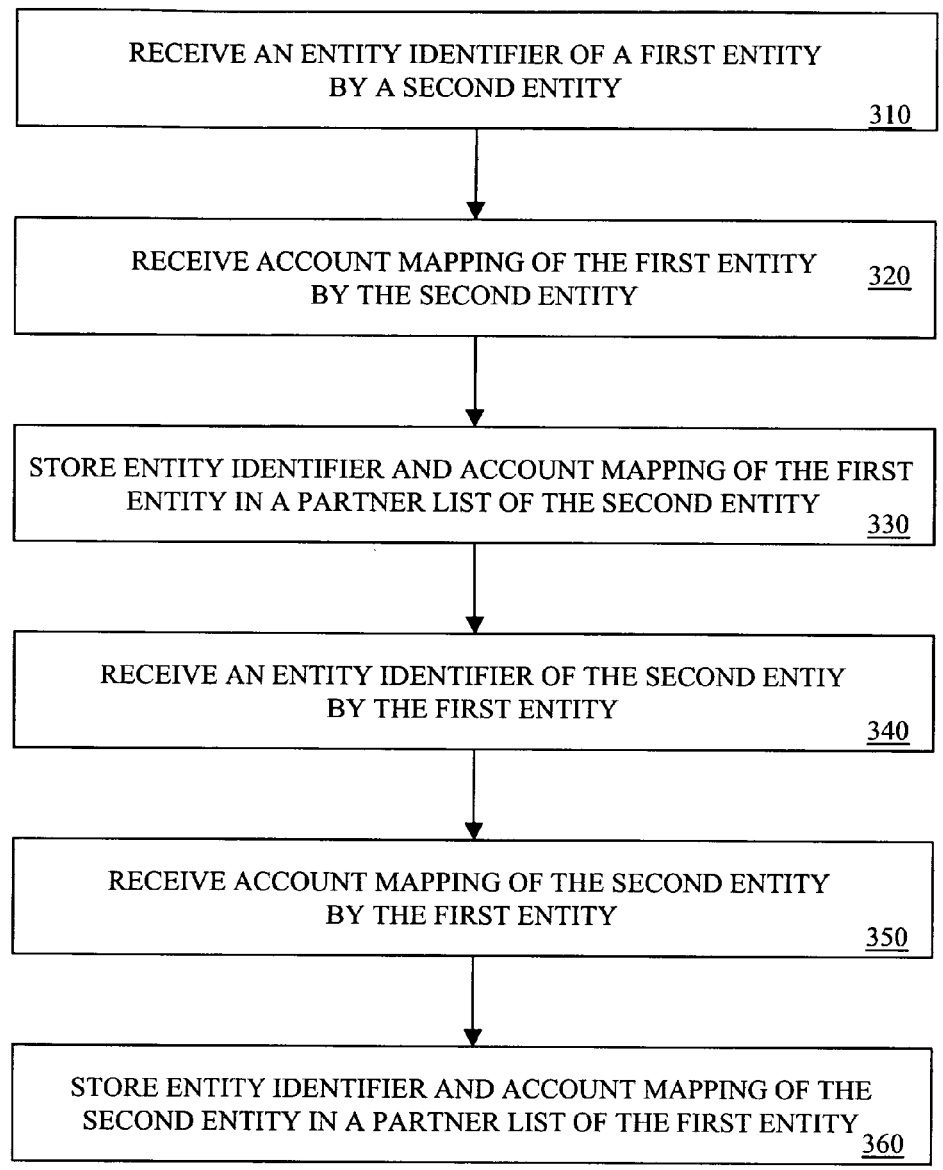
FIG. 3 shows a flow diagram of a computer-implemented method of configuring an interoperable single sign-on system, in accordance with one embodiment of the present invention.

Referring now to FIG. 3, a flow diagram of a computer-implemented method of configuring an interoperable single sign-on system, in accordance with one embodiment of the present invention, is shown. The method of the present embodiment may be realized as a series of instructions (e.g., code) and information (e.g., data) that reside on a computer-readable medium, such as computer memory, and are executed and manipulated by a processor. When executed, the instructions cause the processor to implement the process of configuring an interoperable single sign-on system. As depicted in FIG. 3, the method comprises receiving an entity identifier (e.g., server A), a certificate, a network address (e.g., internet protocol address) and/or the like of a first entity by a second entity, at step 310. The entity identifier, certificate, network address and/or the like uniquely identifies the particular entity. The method further comprises receiving an account mapping between the first entity and the second entity by the second entity, at step 320. The account mapping defines how the subject between the first entity (e.g., local site) and the second entity (e.g., partner site) are mapped to each other. In an exemplary implementation, the account mapping comprises a java class which provides an interface that is implemented to map a partner account of the first entity to a user account of the second entity.

The method may optionally comprise receiving an attribute mapping, a site attribute list, action mapping and/or the like, between the first entity and the second entity, by the second entity. The attribute mapping defines how an attribute and/or an attribute namespace between the first entity and the second entity are mapped. The site attribute list defines what attributes need to be exchanged between the first entity and second entity. The action mapping defines what authorization decision information are exchanged between the first entity and the second entity.

The entity identifier, client certificate, network address and/or the like of the first entity is stored as one or more fields of a corresponding record in a partner list accessible to a second entity, at step 330. The account mapping between the first entity and the second entity is stored as another field of the corresponding record in the partner list accessible to the second affiliated entity. Optionally, the attribute mapping, the site attribute list, action mapping and/or the like of the first entity to the second entity may be stored as additional fields of the corresponding record in the partner list accessible to the second affiliated entity.

The method further comprises receiving an entity identifier, a client certificate, network address and/or the like of the second entity by the first entity, at step 340. The method further comprises receiving an account mapping between the second entity and the first entity by the first entity, at step 350. The method may optional further comprise receiving an attribute mapping, a site attribute list, action mapping and/or the like, between the second entity and the first entity, by the first entity.

The entity identifier, certificate, network address and/or the like of the second affiliated entity is stored as one or more fields of a corresponding record in a partner list accessible to the first affiliated entity, at step 360. The account mapping, between the second entity and the first entity is stored as another field of the corresponding record in the partner list accessible to the first affiliated entity. Optionally, the attribute mapping, the site attribute list, action mapping and/or the like of the second entity to the first entity may be stored as additional fields of the corresponding record in the partner list accessible to the first entity.

The method may be repeated for each pair of entities in a network. Thus, the partner list of each entity may comprise a record, including an entity identifier and an account mapping, for each partner entity. Each record in an entity's partner list may further include a corresponding client certificate, network address, attribute mapping, site attribute list, account mapping, and/or the like.

Referring now to FIG. 4, an exemplary trusted partner list, in accordance with one embodiment of the present invention, is shown. As depicted in FIG. 4, the trusted partner list of a first entity comprises a plurality of records 410. In one implementation, each record 410 comprises an identifier of a second entity 420, and an account mapping between the first entity and the second entity 450. Each record 410 may further comprise an a certificate 430, network address 440 and/or the like corresponding to the second entity, an attribute mapping 460, a site attribute list 470, and action mapping 480 and/or the like, between the first entity and the second entity.

For example, the partner list for server A may comprise entity identifiers for servers B and C, and account mappings of A to B and A to C. Additionally, the partner list for server A may further comprise certificates of B and C, network address (e.g., internet protocol addresses) of B and C, attribute mappings of A to B and A to C, site attribute lists of A to B and A to C, and action mappings of A to B and A to C.

Figure 5:
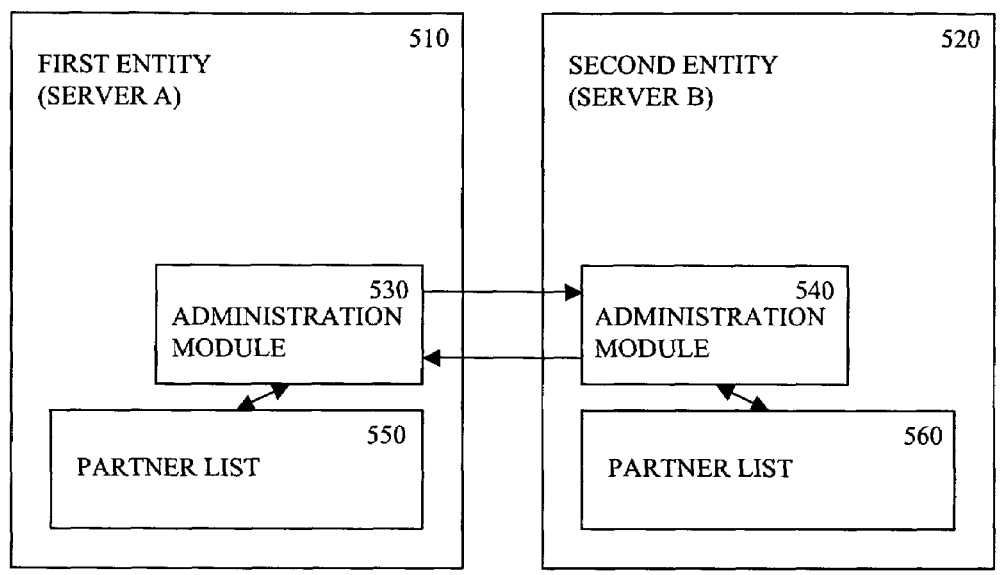
FIG. 5 shows a block diagram of a system providing for configuring an interoperable single sign-on system, in accordance with one embodiment of the present invention.

Referring now to FIG. 5, a block diagram of a system providing for configuring an interoperable single sign-on system, in accordance with one embodiment of the present invention, is shown. As depicted in FIG. 5, each entity (e.g., server A and B) 510, 520 comprises an administration module 530, 540 and a partner list 550, 560, respectively. The administration module 530 of the first entity 510 receives an entity identifier and/or the like of a second entity 520 and stores it in a first field of a record in the partner list 550 of the first entity 510. The administration module 530 of the first entity 510 also receives a mapping between an account of the second entity 520 and an account of the first entity 510. The administration module 530 of the first entity 510 stores the account mapping in a second field of the corresponding record in the partner list 550 of the first entity 510.

Optionally, the administration module 530 of the first entity 510 may also receive a client certificate and/or network address of the second entity 520. The administration module 530 of the first entity 510 may also receive an attribute mapping, a site attribute list, an action mapping and/or the like between the second entity and the first entity. The administration module 530 of the first entity 510 stores the certificate, network address, attribute mapping, site attribute list, action mapping and/or the like in a plurality of additional fields of the corresponding record in the partner list 550 of the first entity 510.

Similarly, the administration module 540 of the second entity 520 receives an entity identifier and/or the like of the first entity 510 and stores it in a first field of a record in a partner list 560 of the second entity 520. The administration module 540 of the second entity 520 also receives a mapping between an account of the first entity 510 and an account of the second entity 520. The administration module 540 of the second entity 520 stores the account mapping in a second field of the corresponding record in the partner list 560 of the second entity 520.

Optionally, the administration module 540 of the second entity 520 may also receive a client certificate and/or network address of the first entity 510. The administration module 540 of the second entity 520 may also receive an attribute mapping, a site attribute list, an action mapping and/or the like between the first entity 510 and the second entity 520. The administration module 540 of the second entity 520 stores the certificate, network address, attribute mapping, site attribute list, action mapping and/or the like in a plurality of additional fields of the corresponding record in the trusted partner list 560 of the second entity 520.

The client certificate, network address, account mapping, attribute mapping, site attribute list, action mapping and/or the like may be provided to the first and second entities by an administrator or the like. In one implementation, the mappings are implemented as a java class. The account mapping defines how the subject between two sites (e.g., the first and second entities 510, 520) are mapped to each other. In one implementation, the account mapping between a partner source identifier and the implementation class are configured at the partner URLs field in a SAML service. The attribute mapping defines how attributes between two sites are mapped. In one implementation, the attribute mapping between the partner source identifier and the implementation class are configured at the partner site field in the SAML service. The site attribute list defines the list of attributes which will be returned as attribute statement elements as part of an assertion. In one implementation, the site attribute list between the partner source identifier and the implementation class are configured at the partner URLs field in the SAML service. The action mapping defines how the second entity's authorization decision is mapped to a policy decision of the first entity's policy decision. In one implementation, the action mapping between the partner source identifier and the implementation class are configured at the partner site field in the SAML service. Accordingly, the mappings may advantageously comprise straight mappings or mappings of any complexity.

Figure 6:
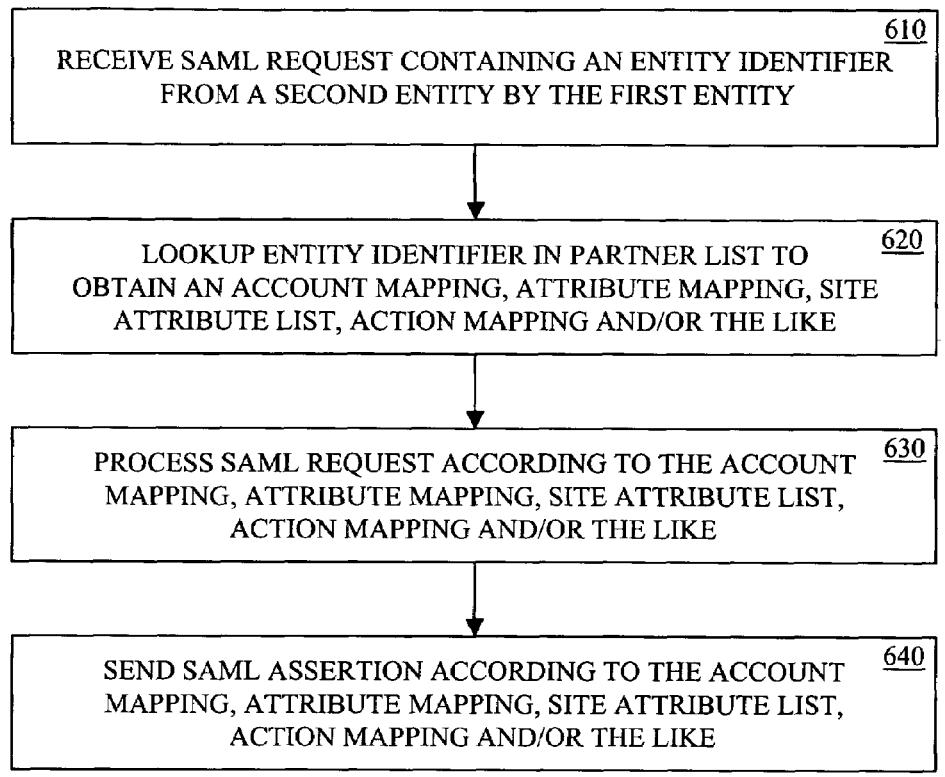
FIG. 6 shows a computer-implemented method of providing an interoperable single sign-on system, in accordance with one embodiment of the present invention.

Referring now to FIG. 6, a computer-implemented method of providing an interoperable single sign-on system, in accordance with one embodiment of the present invention, is shown. The method of the present embodiment may be realized as a series of instructions (e.g., code) and information (e.g., data) that reside on a computer-readable medium, such as computer memory, and are executed and manipulated by a processor. When executed, the instructions cause the processor to implement the functionality, processes and/or benefits of an interoperable single sign-on system. As depicted in FIG. 6, the method begins with receipt by a first entity of a SAML request from a second entity, at step 610. The SAML request contains an entity identifier, certificate, network address and/or the like. At step 620, the entity identifier, certificate, network address and/or the like contained in the SAML request is looked-up in a partner list of the first entity. An account mapping, attribute mapping, site attribute list, action mapping and/or the like is obtained from a record in the partner list containing the matching entity identifier, certificate, network address and/ or the like.

Thereafter, the SAML request may be processed according to the account mapping, attribute mapping, site attribute list, action mapping and/or the like at step 630. In an exemplary implementation, a SAML request received at a local entity from a partner entity may indicate that a client (e.g., client 1A) is logged-on and has a username (e.g., jdoe). Therefore, the local entity (server B) may process the SAML request utilizing the account mapping provided in its partner list. The account mapping for example, may map the username of the partner entity to the username on the local entity (e.g., janed). The exemplary account mapping may comprise "if user (server A)=jdoe, then user (server B)=janed."

In another exemplary implementation, a SAML request received at a local entity from a partner entity may indicate the client is logged-on and has an address (e.g., 101 First Ave., Anytown, Calif. 12121), wherein the address is passed as four fields (e.g, street, city, state, and zip). Therefore, the local entity may process the SAML request utilizing the attribute mapping provided in its partner list. The attribute mapping for example, may map the address of the partner entity, wherein the address is utilized as four fields, to the address on the local entity, wherein the address is utilized as a single field. In so doing the mapping may cause the four address fields to be concatenated to form a single address field.

In yet another exemplary implementation, a SAML request received at the local entity may indicate that the client is logged-on and only has permission to access records in a system (e.g., financial) corresponding to the particular client. Therefore, the local entity may process the SAML request utilizing the action mapping provided in its partner list. The action mapping for example may map the permission to access particular records associated with the client on the partner entity to the local entity (e.g., payroll). Thus, the access permission established on the partner entity is mapped to a corresponding access permission on the local entity. Alternatively, the SAML request may pass the social security number of the client, as a field "ssn". The corresponding attribute mapping may then be utilized to map the "ssn" of the request to the "social security" namespace of the local entity. Thereafter the local entity could determine access permissions based upon the content of the "social security" namespace of the client.

Furthermore, at step 640, a SAML assertion may be sent in response to the SAML request. The SAML assertion may be sent to the second entity according to the account mapping, attribute mapping, site attribute list, action mapping and/or the like. In an exemplary implementation, the local site may utilize a corresponding record in its partner list, such as a site attribute list, to determine what information to return in a SAML assertion. Therefore, the SAML assertion will contain the information required by the second entity.

Figure 7:
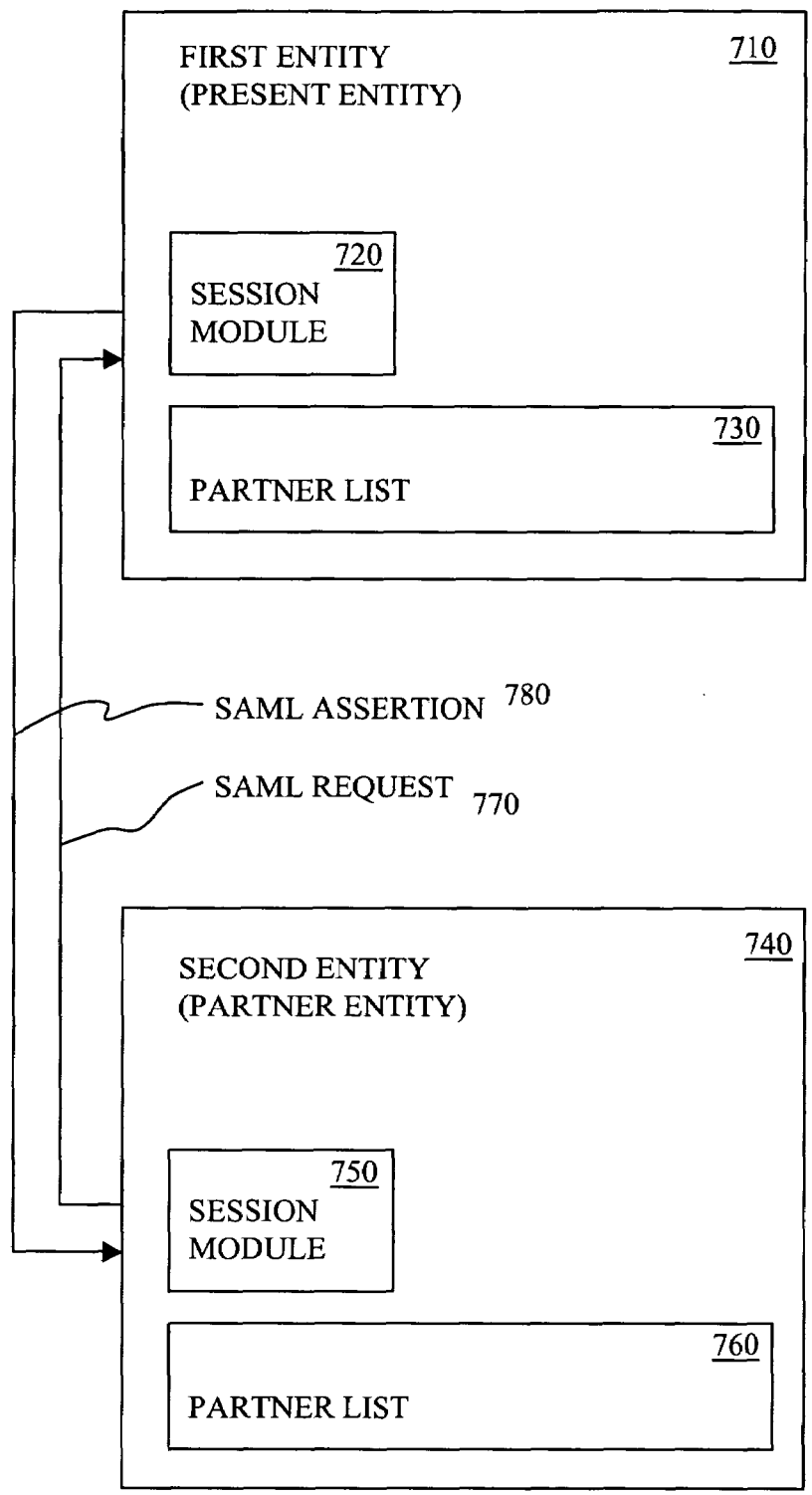
FIG. 7 shows a block diagram of a system providing an interoperable single sign-on session, in accordance with one embodiment of the present invention.

Referring now to FIG. 7, a block diagram of a system providing an interoperable single sign-on session, in accordance with one embodiment of the present invention, is shown. As depicted in FIG. 7, the interoperable single sign-on system comprises a first entity 710 and a second entity 740. The first and second entities 710, 740 each comprise a session module 720, 750 and a partner list 730, 760, respectively. The session module 720 of the first entity 710 receives a SAML request 770 from the session module 750 of the second entity 740. The SAML request 770 contains an entity identifier, certificate, network address and/or the like. The session module 720 of the first entity 710 looks-up the entity identifier, certificate, network address and/or the like in its partner list 730. The record in the partner list 730 of the first entity 710 which contains the matching entity identifier, certificate, network address and/ or the like includes an account mapping, an attribute mapping, a site attribute list, an action mapping and/or the like. Accordingly, the first entity 710 may map elements in the SAML request which relate to the content and organization of information utilized by the second entity to the corresponding content and organization of information utilized by the first entity. The first entity 710 may also return a SAML assertion having elements which are required by the second entity 740.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of configuring an open interoperable security assertion markup language (SAML) session comprising:
   receiving a first entity identifier of a first entity by a second entity;
   receiving a first account mapping between said first entity and said second entity by said second entity;
   storing said first entity identifier and said first account mapping as a first record in a first partner list accessible to said second entity;
   receiving a second entity identifier of said second entity by said first entity;
   receiving a second account mapping between said second entity and said first entity by said first entity;
   storing said second entity identifier and said second account mapping as a second record in a second partner list accessible to said first entity;
   receiving one or more mappings between said first entity and said second entity by said second entity, wherein the mappings are selected from the group consisting of an attribute mapping, a site attribute list, an account mapping, and an action mapping;
   storing said one or more mappings between said first entity and said second entity as a part of said first record in said first partner list accessible to said second entity;

receiving one or more mappings between said second entity and said first entity by said first entity, wherein the mappings are selected from the group consisting of an attribute mapping, a site attribute list, an account mapping, and an action mapping; and storing said one or more mappings between said second entity and said first entity as part of said second record in said second partner list accessible to said first entity.

2. The method according to claim 1, wherein said attribute mapping, said site attribute list, said account mapping, and said action mapping are implemented as a java class.

3. The method according to claim 1, wherein said attribute mapping defines a mapping of an attribute between said second entity and said first entity.

4. The method according to claim 1, wherein said site attribute list defines a list of one or more attributes to be exchanged between said second entity and said first entity.

5. The method according to claim 1, wherein said action mapping defines a mapping of an authorization of said second entity to an authorization of said first entity.

6. A method of configuring an open interoperable security assertion markup language (SAML) session comprising:

receiving a first entity identifier of a first entity by a second entity;

receiving a first account mapping between said first entity and said second entity by said second entity;

storing said first entity identifier and said first account mapping as a first record in a first partner list accessible to said second entity;

receiving a second entity identifier of said second entity by said first entity;

receiving a second account mapping between said second entity and said first entity by said first entity;

storing said second entity identifier and said second account mapping as a second record in a second partner list accessible to said first entity;

receiving a first client certificate of said first entity by said second entity;

receiving a first network address of said first entity by said second entity;

storing said first client certificate and said first network address as another part of said first record in said first partner list accessible to said second entity;

receiving a second client certificate of said second entity by said first entity;

receiving a second network address of said second entity by said first entity; and storing said second client certificate and said second network address as another part of said second record in said second partner list accessible to said first entity.

7. A method of providing an open interoperable security assertion markup language (SAML) session comprising:

receiving, by a first entity, a SAML request from a second entity, comprising an entity identifier;

searching a partner list of said first entity for a record containing a matching entity identifier, wherein said record contains an account mapping and an attribute mapping, wherein said account mapping defines a mapping of an account of said second entity to an account of said first entity, and wherein said attribute mapping defines a mapping of an attribute of said second entity to an attribute of said first entity;

processing said SAML request in accordance with said account mapping and said attribute mapping; and sending a SAML assertion in response to said SAML request.

8. The method according to claim 7, wherein said attribute mapping defines a mapping of an attribute namespace of said second entity to an attribute namespace of said first entity.

9. The method according to claim 7, wherein said record further contains an action mapping, and wherein said SAML request is processed in accordance with said account mapping, said attribute mapping, and said action mapping.

10. The method according to claim 9, wherein said action mapping defines a mapping of an authorization decision of said second entity to an authorization decision of said first entity.

11. The method according to claim 7, wherein said record further contains a site attribute list, and wherein said method further comprises:

generating said SAML assertion in accordance with said site attribute list.

12. The method according to claim 11, wherein said site attribute list defines an attribute that is to be returned by said first entity to said second entity.

13. A system for configuring an open and interoperable security assertion markup language (SAML) session comprising:

a first entity comprising:

a first administration module for receiving a first entity identifier of a second entity and a first account mapping between said second entity and said first entity; and a first partner list, accessible by said first administration module, for storing said first entity identifier and said first account mapping; and said second entity comprising:

a second administration module for receiving a second identifier of said first entity and a second account mapping between said first entity and said second entity; and a second partner list, accessible by said second administration module, for storing said second entity identifier and said second account mapping; wherein said first administration module receives a first attribute mapping between said second entity and said first entity;

said first partner list stores said first attribute mapping;

said second administration module receives a second attribute mapping between said first entity and said second entity; and said second partner list stores said second attribute mapping.

14. The system according to claim 13, wherein said attribute mapping defines a mapping of an attribute of said second entity to said first entity.

15. A system for configuring an open and interoperable security assertion markup language (SAML) session comprising:

a first entity comprising:

a first administration module for receiving a first entity identifier of a second entity and a first account mapping between said second entity and said first entity; and a first partner list, accessible by said first administration module, for storing said first entity identifier and said first account mapping; and said second entity comprising:
a second administration module for receiving a second identifier of said first entity and a second account mapping between said first entity and said second entity; and
a second partner list, accessible by said second administration module, for storing said second entity identifier and said second account mapping; wherein
said first administration module receives a first site attribute list between said second entity and said first entity;
said first partner list stores said first site attribute list;
said second administration module receives a second site attribute list between said first entity and said second entity; and
said second partner list stores said second site attribute list.

16. The system according to claim 15, wherein said site attribute list defines an attribute that is to be returned by said second entity to said first entity.

17. A system for configuring an open and interoperable security assertion markup language (SAML) session comprising:
a first entity comprising:
a first administration module for receiving a first entity identifier of a second entity and a first account mapping between said second entity and said first entity; and
a first partner list, accessible by said first administration module, for storing said first entity identifier and said first account mapping; and
said second entity comprising:
a second administration module for receiving a second identifier of said first entity and a second account mapping between said first entity and said second entity; and
a second partner list, accessible by said second administration module, for storing said second entity identifier and said second account mapping; wherein
said first administration module receives a first action mapping between said second entity and said first entity;
said first partner list stores said first action mapping;
said second administration module receives a second action mapping between said first entity and said second entity; and
said second partner list stores said second action mapping.

18. The system according to claim 17, wherein said action mapping defines a mapping of an authorization decision of said second entity to an authorization decision of said first entity.

19. A system for providing an open and interoperable security assertion markup language (SAML) session comprising:
a first entity comprising:
a first session module for generating and sending a SAML request, said SAML request comprising an entity identifier; and
a second entity, communicatively coupled to said first entity, comprising;
a second session module for receiving and processing said SAML request; and
a partner list, accessible by said second session module, comprising a record that contains a matching entity identifier, said record further containing an account mapping and an attribute mapping, wherein said account mapping defines a mapping of an account of said second entity to an account of said first entity, and wherein said attribute mapping defines a mapping of an attribute of said second entity to an attribute of said first entity;
wherein said second session module searches for said record, processes said SAML request in accordance with said account mapping and said attribute mapping, and sends a SAML assertion in response to said SAML request.

20. The system according to claim 19, wherein said record further contains an action mapping between said first entity and said second entity, and wherein said SAML request is further processed according to said action mapping.

21. The system according to claim 19, wherein said record further contains a site attribute list between said first entity and said second entity, and wherein said second session module generates said SAML assertion in accordance with said site attribute list.

22. A computer readable medium comprising one or more instructions which, when executed by one or more processors, cause the one or more processors to implement a method comprising:
receiving, by a first entity, a security assertion markup language (SAML) request from a second entity, wherein the SAML request comprises an entity identifier;
searching a partner list for a record containing a matching entity identifier, wherein said record contains an account mapping and an attribute mapping, wherein said account mapping defines a mapping of an account of said second entity to an account of said first entity, and wherein said attribute mapping defines a mapping of an attribute of said second entity to an attribute of said first entity;
processing said SAML request in accordance with said account mapping and said attribute mapping; and
sending a SAML assertion in response to said SAML request.

23. The computer readable medium of claim 22, wherein said record further contains an action mapping, and wherein said SAML request is processed in accordance with said account mapping, said attribute mapping, and said action mapping.

24. The computer readable medium according to claim 23, wherein said action mapping defines a mapping of an authorization decision of said second entity to an authorization decision of said first entity.

25. The computer readable medium according to claim 22, wherein said record further contains a site attribute list, and wherein said method implemented by said one or more processors further comprises:
generating said SAML assertion in accordance with said site attribute list.

26. The computer readable medium according to claim 25, wherein said site attribute list defines an attribute that is to be returned by said first entity to said second entity.

* * * * *